(12) United States Patent
Song et al.

(10) Patent No.: US 11,377,707 B2
(45) Date of Patent: Jul. 5, 2022

(54) CLAD STEEL PLATE HAVING EXCELLENT STRENGTH AND FORMABILITY, AND PRODUCTION METHOD THEREFOR

(71) Applicant: POSCO, Pohang-si (KR)

(72) Inventors: Tae-Jin Song, Gwangyang-si (KR); Man-Young Park, Gwangyang-si (KR); Won-Tae Cho, Gwangyang-si (KR)

(73) Assignee: POSCO, Pohang-si (KR)

(*) Notice: Subject to any disclaimer, the term of this patent is extended or adjusted under 35 U.S.C. 154(b) by 420 days.

(21) Appl. No.: 16/308,668

(22) PCT Filed: Jun. 23, 2017

(86) PCT No.: PCT/KR2017/006666
§ 371 (c)(1),
(2) Date: Dec. 10, 2018

(87) PCT Pub. No.: WO2017/222342
PCT Pub. Date: Dec. 28, 2017

(65) Prior Publication Data
US 2019/0153559 A1    May 23, 2019

(30) Foreign Application Priority Data
Jun. 23, 2016 (KR) .................. 10-2016-0078561

(51) Int. Cl.
*C22C 38/38* (2006.01)
*C21D 9/46* (2006.01)
(Continued)

(52) U.S. Cl.
CPC .............. *C21D 9/46* (2013.01); *B32B 15/011* (2013.01); *C21D 6/002* (2013.01); *C21D 6/005* (2013.01);
(Continued)

(58) Field of Classification Search
CPC .......... C21D 9/46; C21D 9/50; C21D 8/0247; C21D 6/002; C21D 6/008; C21D 6/005;
(Continued)

(56) References Cited

U.S. PATENT DOCUMENTS 8,137,819 B2    3/2012    Koseki et al.
2008/0240969 A1    10/2008    Kim et al.
(Continued)

FOREIGN PATENT DOCUMENTS

CN    103168105    6/2013
CN    103717773    4/2014
(Continued)

OTHER PUBLICATIONS

CN-105543649-A, machine translation. (Year: 2016).*
(Continued)

*Primary Examiner* — John A Hevey
(74) *Attorney, Agent, or Firm* — Cantor Colburn LLP

(57) ABSTRACT

A clad steel plate, having excellent strength and formability, may include a base material; and a cladding material provided on both side surfaces of the base material, wherein the base material is austenitic high-manganese steel comprising, by weight, 0.3% to 1.4% of C, 12% to 25% of Mn, and a remainder of Fe and inevitable impurities, the cladding material is a martensitic carbon steel comprising, by weight, 0.09% to 0.4% of C, 0.3% to 4.5% of Mn, and a remainder of Fe and inevitable impurities.

10 Claims, 2 Drawing Sheets

(51) Int. Cl.
| | |
|---|---|
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/08* | (2006.01) |
| *C22C 38/22* | (2006.01) |
| *C22C 38/26* | (2006.01) |
| *C22C 38/28* | (2006.01) |
| *C22C 38/32* | (2006.01) |
| *C21D 9/50* | (2006.01) |
| *C23C 2/12* | (2006.01) |
| *C23C 2/02* | (2006.01) |
| *C23C 2/00* | (2006.01) |
| *C23C 2/06* | (2006.01) |
| *C21D 9/42* | (2006.01) |

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0247* (2013.01); *C21D 9/50* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/38* (2013.01); *C23C 2/00* (2013.01); *C23C 2/02* (2013.01); *C23C 2/06* (2013.01); *C23C 2/12* (2013.01); *C21D 9/42* (2013.01); *C21D 2211/001* (2013.01); *C21D 2211/008* (2013.01)

(58) Field of Classification Search
CPC .. C21D 8/0205; C21D 8/0226; C21D 8/0236; C21D 9/42; C21D 2211/001; C21D 2211/008; C23C 2/12; C23C 2/02; C23C 2/00; C23C 2/06; C22C 38/38; C22C 38/001; C22C 38/002; C22C 38/08; C22C 38/22; C22C 38/26; C22C 38/28; C22C 38/32; C22C 38/02; C22C 38/04; C22C 38/06; C22C 38/12; C22C 38/14; C22C 37/00; C22C 38/18; B32B 15/011

See application file for complete search history.

(56) References Cited

U.S. PATENT DOCUMENTS

| | | | |
|---|---|---|---|
| 2008/0271823 A1 | 11/2008 | Hofmann et al. | |
| 2013/0189539 A1* | 7/2013 | Van De Langkruis | .. C21D 9/48 428/638 |
| 2014/0161659 A1 | 6/2014 | Murakami et al. | |
| 2014/0162088 A1 | 6/2014 | Kawata et al. | |
| 2014/0212684 A1 | 7/2014 | Kawata et al. | |
| 2021/0260862 A1* | 8/2021 | Song | ....................... B32B 15/18 |

FOREIGN PATENT DOCUMENTS

| | | | |
|---|---|---|---|
| CN | 103717774 | | 4/2014 |
| CN | 103732779 | | 4/2014 |
| CN | 105543649 | | 5/2016 |
| CN | 105543649 | A * | 5/2016 |
| JP | 2008538384 | | 10/2008 |
| JP | 2009235492 | | 10/2009 |
| JP | 2010077531 | | 4/2010 |
| JP | 5221348 | | 6/2013 |
| KR | 20070023831 | | 3/2007 |
| KR | 20090070504 | | 7/2009 |
| KR | 20150075327 | | 7/2015 |
| KR | 20150075332 | | 7/2015 |
| WO | 2012048844 | | 4/2012 |

OTHER PUBLICATIONS

CN105543649, translation provided on IDS, dated Jul. 2, 2019. Reference published May 4, 2016. (Year: 2016).*
International Search Report—PCT/KR2017/006666 dated Sep. 5, 2017.
European Search Report—European Application No. 17815755.8, dated Apr. 11, 2019, ASTM International and Pavlina.
Pavlina, et al., Correlation of Yield Strength and Tensile Strength with Hardness for Steels, Journal of Materials Engineering and Performance, 2008, pp. 888-893.
Standard Hardness Conversion Tables for Metals Relationship Among Brinell Hardness, Vickers Hardness, Rockwell Hardness, Superficial Hardness, Knoop Hardness, and Scleroscope Hardness, ASTM International, 2002, pp. 1-21.
Chinese Office Action—Chinese Application No. 201780038972.1 dated Jun. 1, 2020.
Japanese Office Action—Japanese Application No. 2018-566818 dated Jan. 28, 2020.

* cited by examiner

CLAD STEEL PLATE HAVING EXCELLENT STRENGTH AND FORMABILITY, AND PRODUCTION METHOD THEREFOR

TECHNICAL FIELD

The present disclosure relates to a clad steel plate having excellent strength and formability, and a production method for the same, and, more particularly, to a clad steel plate having excellent strength and formability, which may be used for a vehicle structural member, or the like, by press molding.

BACKGROUND ART

In recent years, due to the regulation of carbon dioxide for reducing global warming, there has been strong demand for the lightening of vehicles. At the same time, the strength of steel plates of vehicles has been continuously increasing to improve the collision stability of vehicles. In order to produce such a high-strength steel plate, it is common to utilize a low-temperature transformed structure. However, when the low-temperature transformed structure is used to achieve a high strength, it is difficult to secure an elongation of 20% or more at a tensile strength of 1 GPa or more, and thus it is difficult to apply a cold-press forming method to components having complicated shapes. Therefore, there is a problem in that it may be difficult to freely design components suitable for a desired application.

Meanwhile, when ferrite based ultra-low carbon steel or low carbon steel is used to produce components having complicated shapes by a cold press forming method, the required formability may be secured, but it may be difficult to secure a tensile strength of approximately 400 MPa. Therefore, since a thickness of a steel material should be further increased, there may be a problem in that a significant reduction in weight of the vehicles may not be achieved.

Meanwhile, Patent Document 1 proposes a method in which a large amount of austenite-stabilizing elements such as carbon (C) and manganese (Mn) are added to maintain a steel structure as an austenite single phase, and strength and formability are simultaneously secured using a twin occurring during deformation. In order to secure such an austenite single phase structure, it is common to add 0.5 wt. % or more of carbon and 15 wt. % or more of Mn.

However, in this case, manufacturing costs of the steel plate may increase due to the addition of a large amount of Mn. In addition, there is a limit to secure ultra-high strength. Further, there may be a problem in that it may be difficult to secure the plating properties by a Mn oxide.

In addition, the development of steel to meet the desired strength and formability requirements requires high costs and large time investments for the development.

Accordingly, there is a demand for development of a steel plate, which is excellent in terms of strength and formability, is easy to secure a desired strength and formability, is freely able to be designed for a desired application, and is excellent in plating properties.

Patent Document 1: Korean Patent Publication No. 2007-0023831

DISCLOSURE

Technical Problem

An aspect of the present disclosure is to provide a clad steel plate having excellent strength and formability, and a production method for the same.

Meanwhile, the object of the present disclosure is not limited to the description above. It can be understood by those of ordinary skill in the art that there is no difficulty in understanding the additional problems of the present disclosure.

Technical Solution

According to an aspect of the present disclosure, a clad steel plate, having excellent strength and formability, includes:
a base material; and
cladding materials provided on both side surfaces of the base material,
wherein the base material is austenitic high-manganese steel comprising, by weight, 0.3% to 1.4% of C, 12% to 25% of Mn, and a remainder of Fe and inevitable impurities,
the cladding materials are martensitic carbon steels comprising, by weight, 0.09% to 0.4% of C, 0.3% to 4.5% of Mn, and a remainder of Fe and inevitable impurities.

According to another aspect of the present disclosure, a production method for a clad steel plate, having excellent strength and formability, includes:
preparing a base material, which is austenitic high-manganese steel comprising, by weight, 0.3% to 1.4% of C, 12% to 25% of Mn, and a remainder of Fe and inevitable impurities;
preparing cladding materials, which are martensitic carbon steel comprising, by weight, 0.09% to 0.4% of C, 0.3% to 4.5% of Mn, and a remainder of Fe and inevitable impurities;
disposing the base material between two of the cladding materials to obtain a laminate;
welding an edge of the laminate, and heating the welded laminate to a temperature within a range of 1050° C. to 1350° C.;
finish rolling the heated laminate to a temperature within a range of 750° C. to 1050° C., to obtain a hot-rolled steel plate;
coiling the hot-rolled steel plate at 50° C. to 700° C.;
pickling the coiled hot-rolled steel plate, and applying a cold-reduction rate of 35% to 90% thereto to obtain a cold-rolled steel plate; and
annealing the cold-rolled steel plate at a temperature in a range of between 550° C. or higher and A3+200° C. or lower of the cladding material.

Advantageous Effects

According to an aspect of the present disclosure, a clad steel plate, and a production method for the same, having a yield strength of 700 MPa or more, a product of tensile strength and elongation of 25,000 MPa %, and excellent formability, to preferably be applied to a steel plate for vehicles, and to a cold press forming method, may be provided.

In addition, the desired strength and formability by controlling a thickness ratio of a cladding material and a base material is easy to secure, components suitable for a desired application may be freely designed, and an excellent plating properties may also be exhibited.

BEST MODE FOR INVENTION

Figure 1:
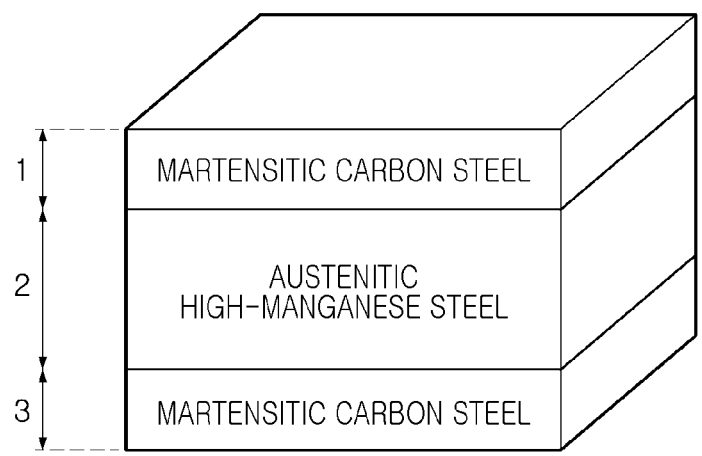
FIG. 1 is a schematic view of a clad steel plate in which austenitic high-manganese steel is used as a base material (B) and martensitic carbon steels are used as cladding materials (A and C)

Hereinafter, preferred embodiments of the present disclosure will be described. However, the embodiments of the present disclosure may be modified into various other embodiments, and the scope of the present disclosure is not limited to the embodiments described below. Further, the embodiments of the present disclosure are provided to more fully explain the present disclosure to those skilled in the art.

The present inventors have succeeded in securing formability by keeping a microstructure of steel as austenite at room temperature by an addition of a large amount of manganese and carbon in the conventional high-manganese steel plate. However, they has recognized various problems representing that manufacturing costs are high due to an addition of a large amount of alloying elements, and collision and plating properties are deteriorated due to a relatively low yield strength, and has thus studied deeply the problems to be solved.

As a result, excellent strength and formability may be secured by manufacturing a composite steel plate comprising austenitic high manganese steel having excellent formability as a base material and a martensitic carbon steel having a high strength and a low manufacturing costs as a cladding material. In addition, the desired strength and formability by controlling a thickness ratio of a cladding material and a base material is easy to secure, components suitable for a desired application may be freely designed, and an excellent plating properties may also be exhibited. Therefore, the present disclosure is completed on the basis of the features described above.

Clad Steel Plate Having Excellent Strength and Formability

Hereinafter, a clad steel plate having excellent strength and formability according to an aspect of the present disclosure will be described in detail.

A clad steel plate according to an aspect of the present disclosure, having excellent strength and formability, may include:

a base material; and cladding materials provided on both side surfaces of the base material, wherein the base material is austenitic high-manganese steel comprising, by weight, 0.3% to 1.4% of C, 12% to 25% of Mn, and a remainder of Fe and inevitable impurities, the cladding materials are martensitic carbon steels comprising, by weight, 0.09% to 0.4% of C, 0.3% to 4.5% of Mn, and a remainder of Fe and inevitable impurities.

Hereinafter, the base material and the cladding material of the present disclosure will be described, respectively, and then the clad steel plate including the cladding material provided on both side surfaces of the base material will be described.

Base Material (Austenitic High-Manganese Steel)

Hereinafter, an alloy composition of the austenitic high-manganese steel constituting the base material of the clad steel plate as one aspect of the present disclosure will be described in detail. Units of each element content are weight percent (wt. %), unless otherwise specified.

Carbon (C): 0.3% to 1.4%

Carbon may be an element contributing to stabilization of an austenite phase. As the content thereof increases, there may be a favorable aspect in securing the austenite phase. In addition, carbon may play a role in increasing tensile strength and elongation at the same time by increasing stacking fault energy of steel. When the content of carbon is lower than 0.3%, an amount of Mn to be added for securing the stabilization of the austenite phase may be excessively increased, resulting in an increase in manufacturing costs, and also difficulty in securing tensile strength and elongation.

Meanwhile, when the content thereof exceeds 1.4%, electrical resistivity may increase, and weldability may deteriorate. Therefore, in the present disclosure, the content of carbon is preferably limited to 0.3% to 1.4%.

Manganese (Mn): 12% to 25%

Manganese may be an element that stabilizes the austenite phase together with carbon. When the content thereof is lower than 12%, it may be difficult to secure a stable austenite phase due to formation of an α'-martensite phase during deformation. Meanwhile, when the content thereof exceeds 25%, there may be a problem that further improvement relating to increase in strength, which is a matter of concern of the present disclosure, does not substantially occur, and manufacturing costs increase. Therefore, the content of Mn in the present disclosure is preferably limited to 12% to 25%.

The remainder of the base material may be iron (Fe). Since impurities that are not intended may be inevitably incorporated from a raw material or a surrounding environment in the ordinary manufacturing process, the impurities may not be excluded. The impurities are not specifically mentioned in the present disclosure, as they are known to any person skilled in the art of manufacturing.

In addition to the above composition, the austenitic high-manganese steel constituting the base material may further include, by weight, 0.03% to 2.0% of Si, 0.02% to 2.5% of Al, 0.04% or less of N (excluding 0%), 0.03% or less of P, and 0.03% or less of S.

Silicon (Si): 0.03% to 2.0%

Silicon may be a component that is added to improve yield strength and tensile strength of steel by solid solution strengthening. Since silicon may be used as a deoxidizing agent, the silicon may usually be contained in an amount of 0.03% or more of the steel. When the content of silicon exceeds 2.0%, there may be a problem that electrical resistivity is increased and weldability is weakened. Therefore, the content of silicon is preferably limited to 0.03% to 2.0%.

Aluminum (Al): 0.02% to 2.5%

Aluminum may be an element usually added for deoxidation of steel. In the present disclosure, aluminum may be added to enhance ductility and delayed fracture resistance characteristics of the steel by increasing stacking fault energy to suppress a formation of s-martensite phase.

Aluminum may be an element present in ingot steel as an impurity. Aluminum may cause an excessive cost to be controlled to be lower than 0.02%. Meanwhile, when the content of aluminum exceeds 2.5%, tensile strength of the steel may be reduced, and castability thereof may be deteriorated. Therefore, in the present disclosure, the content of aluminum is preferably limited to 0.02% to 2.5%.

Nitrogen (N): 0.04% or Less (Excluding 0%)

Nitrogen (N) may promote crystal twinning by reacting with Al in austenitic crystal grain during a solidification process to precipitate fine nitrides, thereby improving strength and ductility of a steel plate during molding. When the content thereof exceeds 0.04%, nitrides may excessively be precipitated, and hot workability and elongation may be reduced. Therefore, in the present disclosure, the content of nitrogen is preferably limited to 0.04% or less.

Phosphorus (P): 0.03% or Less

Phosphorus may be an impurity that is inevitably contained, and may be an element that causes mainly deterioration in workability of steel by segregation. Therefore, phosphorus may be desirable to control the content thereof as low as possible. Theoretically, the content of phosphorus is advantageous to be limited to 0%. Phosphorus may be inevitably contained in the manufacturing process. Therefore, it is important to control an upper limit thereof, and in the present disclosure, the upper limit of the content of phosphorus may be controlled to be 0.03%.

Sulfur (S): 0.03% or Less

Sulfur may be an impurity that is inevitably contained. Sulfur may form a coarse manganese sulfide (MnS) to generate defects such as flange cracks, and may greatly reduce hole expandability of a steel plate. Therefore, the content thereof is preferably controlled as low as possible. Theoretically, the content of sulfur is advantageous to be limited to 0%. Sulfur may be inevitably contained in the manufacturing process. Therefore, it is important to control an upper limit thereof, and in the present disclosure, the upper limit of the content of sulfur may be controlled to be 0.03%.

In addition to the above composition, the austenitic high-manganese steel constituting the base material may further comprise, by weight, one or more of 0.01% to 0.5% of Ti, 0.0005% to 0.005% of B, 0.05% to 1.0% of Mo, 0.2% to 3.0% of Cr, 0.01% to 0.5% of Nb, and 0.05% to 0.7% of V.

Titanium (Ti): 0.01% to 0.5%

Titanium may react with nitrogen in steel to precipitate nitrides, thereby formability of hot-rolling being improved. Further, the titanium may play a role of increasing strength by reacting with carbon in a steel material to form a precipitated phase. For this, titanium is preferable to be contained in an amount of 0.01% or more. When the content thereof exceeds 0.5%, precipitates may be formed excessively to worsen fatigue characteristics of components. Therefore, the content of titanium is preferably 0.01% to 0.5%.

Boron (B): 0.0005% to 0.005%

When boron is added in a relatively small amount, grain boundary of a slab may be strengthened to improve hot-rolling properties. When the content of boron is lower than 0.0005%, the above effect may be not sufficiently exhibited. When the content of boron exceeds 0.005%, further performance improvements may not be expected, and the cost may be increased. Therefore, the content of boron is preferably 0.0005% to 0.005%.

Chromium (Cr): 0.2% to 3.0%

Chromium may be an element effective in increasing strength. The content of chromium is preferably 0.2% or more to obtain such an effect. Meanwhile, when the content of chromium exceeds 3.0%, relatively coarse carbides may be formed at grain boundaries during a hot-rolling operation to deteriorate workability of the hot-rolling operation. Therefore, an amount to be added is limited to 3.0% or less. Therefore, the content of chromium is preferably 0.2% to 3.0%.

Molybdenum (Mo): 0.05% to 1.0%

Molybdenum may be added to slow a diffusion rate of carbon to prevent coarsening of carbonitride, and to increase a precipitation hardening effect. The content of molybdenum is preferably 0.05% or more to obtain such an effect. Meanwhile, when the content of molybdenum is more than 1.0%, molybdenum carbide may be formed at a relatively high temperature, causing surface cracking of a slab. Therefore, the content of molybdenum in the present disclosure is preferably 0.05% to 1.0%.

Niobium (Nb): 0.01% to 0.5%

Niobium may be an element that reacts with carbon to form carbides. Niobium may be added to increase yield strength of steel by grain refinement and precipitation hardening. The content of niobium is preferably 0.01% or more to obtain such an effect. Meanwhile, when the content of niobium exceeds 0.5%, relatively coarse carbides may be formed at a relatively high temperature, causing surface cracks of a slab. Therefore, the content of niobium in the present disclosure is preferably limited to 0.01% to 0.5%.

Vanadium (V): 0.05% to 0.7%

Vanadium may be an element that reacts with carbon or nitrogen to form a carbonitride. Vanadium may be a component that may be added to increase yield strength by grain refinement and precipitation hardening. The content of vanadium is preferably 0.05% or more to obtain such an effect. Meanwhile, when the content of vanadium exceeds 0.7%, relatively coarse carbonitrides may be formed at a relatively high temperature, and hot workability may be deteriorated. Therefore, the content of vanadium in the present disclosure is preferably limited to 0.05% to 0.7%.

Meanwhile, in the present disclosure, it is preferable that the austenitic high-manganese steel constituting the base material not only satisfies the above-mentioned component system but also secures an austenite single phase structure as a microstructure of a steel plate. Both strength and elongation may be secured by securing the microstructure as described above. In this case, the austenite single phase means that the microstructure may comprise 95 area % or more of austenite, and a remainder of carbides and inevitable impurities.

Cladding Material (Martensitic Carbon Steel)

Hereinafter, an alloy composition of the martensitic carbon steel constituting the cladding material of the clad steel plate as one aspect of the present disclosure will be described in detail. Units of each element content are weight percent (wt. %), unless otherwise specified.

Carbon (C): 0.09% to 0.4%

Carbon may be an element that increases hardenability of steel, and may be an element which facilitates securing martensite structure. Carbon may be located in an intrusion-type place in martensite to improve strength of steel by solid solution strengthening. When the content thereof is lower than 0.09%, initiation of martensitic transformation may take place at a relatively high temperature. Therefore, since carbon during a cooling operation may be diffused by dislocation, strength of steel by solid solution strengthening may not be expected. Meanwhile, when the content thereof exceeds 0.4%, weldability of a steel plate may be reduced. Therefore, in the present disclosure, the content of carbon is preferably limited to 0.09% to 0.4%.

Manganese (Mn): 0.3% to 4.5%

Manganese may be an element that increases hardenability and improves strength of a steel plate. The content of manganese is preferably 0.3% or more to obtain such an effect. Meanwhile, when the content of manganese exceeds 4.5%, a structure of a segregation layer may lower formability of the steel plate. Therefore, the content of Mn in the present disclosure is preferably limited to 0.3% to 4.5%.

The remaining component of the cladding material may be iron (Fe). Since impurities that are not intended may be inevitably incorporated from a raw material or surrounding environment in the ordinary manufacturing process, the impurities may not be excluded. These impurities are not specifically mentioned in this specification, as they are known to any person skilled in the art of steel manufacturing.

In addition to the above composition, the martensitic carbon steel constituting the cladding material may further include, by weight, 0.03% to 1.0% of Si, 0.02% to 0.3% of Al, 0.04% or less of N (excluding 0%), 0.0005% to 0.005% of B, 0.03% or less of P, and 0.03% or less of S.

Silicon (Si): 0.03% to 1.0%

Silicon (Si) may be dissolved in a steel plate to improve strength of steel. Silicon may be an element present in ingot steel as an impurity, causing excessive costs to be controlled to be lower than 0.03%. When the content thereof exceeds 1.0%, silicon may generate surface oxides and may lower surface quality of a steel plate during an annealing operation. Therefore, the content of silicon is preferably 0.03% to 1.0%.

Aluminum (Al): 0.02% to 0.3%

Aluminum may be an element added for deoxidation. Excessive costs may be required to control the content thereof to lower than 0.02%. When the content thereof exceeds 0.3%, surface oxides may be generated during an annealing operation. Therefore, the content of aluminum is preferably 0.02% to 0.3%.

Nitrogen (N): 0.04% or Less (Excluding 0%)

Nitrogen (N) may be an element that may be inevitably contained. AlN generated by reacting with aluminum that remains in steel may cause surface cracking during a continuous casting process. Therefore, although it is preferable to control the content thereof as low as possible, nitrogen may be inevitably contained in the manufacturing process. It is important to control an upper limit of nitrogen, and in the present disclosure, the upper limit of the content of nitrogen may be controlled to be 0.04%.

Boron (B): 0.0005% to 0.005%

Boron (B) may be an element that is segregated at austenitic grain boundaries and reduces energy of grain boundaries. Boron may be an element that improves hardenability of steel. For this, boron is preferably contained in an amount of 0.0005% or more. When the content thereof exceeds 0.005%, oxide may be formed on a surface to lower a surface quality of a steel plate. Therefore, the content of boron is preferably 0.0005% to 0.005%.

Phosphorus (P): 0.03% or Less

Phosphorus may be an impurity that is inevitably contained, and may be an element that causes mainly deterioration in workability of steel by segregation. Therefore, phosphorus may be desirable to control the content thereof as low as possible. Theoretically, the content of phosphorus is advantageous to be limited to 0%. Phosphorus may be inevitably contained in the manufacturing process. Therefore, it is important to control an upper limit thereof, and in the present disclosure, the upper limit of the content of phosphorus may be controlled to be 0.03%.

Sulfur (S): 0.03% or Less

Sulfur may be an impurity that is inevitably contained. Sulfur may form a coarse manganese sulfide (MnS) to generate defects such as flange cracks, and may greatly reduce hole expandability of a steel plate. Therefore, the content thereof is preferably controlled as low as possible. Theoretically, the content of sulfur is advantageous to be limited to 0%. Sulfur may be inevitably contained in the manufacturing process. Therefore, it is important to control an upper limit thereof, and in the present disclosure, the upper limit of the content of sulfur may be controlled to be 0.03%.

In addition to the above composition, the martensitic carbon steel constituting the cladding material may further comprise, by weight, one or more of 0.1% to 1.0% of Cr, 0.1% to 1.0% of Ni, 0.05% to 1.0% of Mo, 0.005% to 0.05% of Ti, and 0.005% to 0.05% of Nb.

Chromium (Cr): 0.1% to 1.0%

Chromium may be an element that improves the hardenability of steel, and may be an element that promotes formation of a low-temperature transformation phase to improve the strength of steel. The content thereof is preferably 0.1% or more to obtain such an effect. When the content thereof exceeds 1.0%, an excessive increase in manufacturing costs may be caused, as compared with an intended strength improvement effect. Therefore, the content of chromium is preferably 0.1% to 1.0%.

Nickel (Ni): 0.1% to 1.0%

Nickel may be an element that improves hardenability of steel, and may be an element that improves strength of steel. The content thereof is preferably 0.1% or more to obtain such an effect. When the content thereof exceeds 1.0%, an excessive increase in manufacturing cost may be caused, as compared with an intended strength improvement effect. Therefore, the content of nickel is preferably 0.1% to 1.0%.

Molybdenum (Mo): 0.05% to 1.0%

Molybdenum may be an element that improves hardenability of steel, and may be an element that promotes the formation of a low-temperature transformation phase to improve the strength of steel. Further, molybdenum may be an element that improves strength of steel by forming carbide in steel. The content thereof is preferably 0.05% or more to obtain such an effect. When the content thereof exceeds 1.0%, an excessive increase in manufacturing cost may be caused, as compared with an intended strength improvement effect. Therefore, the content of molybdenum is preferably 0.01% to 1.0%.

Titanium (Ti): 0.005% to 0.05%

Titanium (Ti) is preferably in an amount of 0.005% to 0.05%. Titanium may play a role in increasing strength by reacting with nitrogen and carbon in a steel material to form carbonitride. For this, it is preferable that titanium may be contained in an amount of 0.005% or more. When the content thereof exceeds 0.05%, precipitates may be formed excessively, and castability thereof may be deteriorated. Therefore, the content of titanium is preferably 0.005% to 0.05%.

Niobium (Nb): 0.005% to 0.05%

Niobium (Nb) is preferably in an amount of 0.005% to 0.05%. Niobium may be an element that forms carbonitride, such as titanium, and may play a role in increasing strength by reacting with nitrogen and carbon in a steel material. For this, niobium is preferably contained in an amount of 0.005% or more. When the content thereof exceeds 0.05%, precipitates may be formed excessively, and castability thereof may be deteriorated. Accordingly, the content of niobium is preferably 0.005% to 0.05%.

Meanwhile, in the present disclosure, the martensitic carbon steel constituting the cladding material may satisfy the above-mentioned component system, the microstructure may have a martensite content of 65 area % or more, and the remainder may be one or more of retained austenite, ferrite, bainite and carbide. By securing the above-mentioned microstructure, excellent tensile strength and yield strength may be obtained.

In addition, through a tempering treatment, the microstructure may have tempered martensite of 65 area % or more, and the remainder may be composed of one or more of retained austenite, ferrite, bainite and carbide. The martensite transformation according to the tempering treatment may be to improve toughness of steel by removing residual stress generated in the steel.

Clad Steel Plate

A clad steel plate according to one aspect of the present disclosure may include a base material, and cladding materials provided on both side surfaces of the base material.

A clad steel plate may be defined as a laminate type composite material in which two or more surfaces of metal materials are metallurgically bonded and integrated. In general, clad steel plates have been used for special purposes such as (to withstand) extreme corrosive environments by using noble metals such as nickel (Ni) and copper (Cu) as cladding materials.

The base material, which may be an inner steel material of the present disclosure, may be austenitic high-manganese steel excellent in strength and elongation due to high alloy amounts. The austenitic high-manganese steel may be expensive to manufacture due to a large amount of alloy components, and may be difficult to secure yield strength of 900 MPa or more. Therefore, the austenitic high-manganese steel may be unsuitable for use as a vehicle structural member requiring impact resistance.

The cladding material as an outer steel material of the present disclosure may be a martensitic carbon steel excellent in yield strength and tensile strength. The martensitic carbon steel may have relatively low elongation, and may be difficult to secure formability.

The martensitic steel materials may form localized concentration of deformations during molding and low uniform elongation, and may exhibit properties for deteriorating formability. The inventors of the present disclosure have found that, when a clad steel plate containing austenitic high-manganese steel having a high uniform elongation rate is manufactured, locally concentration of deformation of the martensitic steel materials may be prevented, and formability may be improved.

Therefore, in the present disclosure, since the above-mentioned austenitic high-manganese steel may be used as the base material and the above-mentioned martensitic carbon steel may be used as the cladding material on both side surfaces of the base material, the respective disadvantages may be overcome, and excellent effects on strength and formability may be obtained at the same time.

At this time, a thickness of the base material may be 30% to 90% of a thickness of the clad steel plate.

When a thickness of the base material exceeds 90% of a thickness of the clad steel plate, strength may decrease and manufacturing cost may increase. Meanwhile, when a thickness of the base material is lower than 30%, formability of the clad steel plate may be deteriorated.

Further, a thickness of the clad steel plate may be 0.6 mm to 30 mm, more preferably 1.0 mm to 20 mm.

In the clad steel plate, yield strength may be 700 MPa or more, preferably 900 MPa or more, and a product of tensile strength and elongation may be 25,000 MPa % or more. By securing the yield strength, the tensile strength, and the elongation, the clad steel plate may be applied to a vehicle structural member, or the like.

Meanwhile, the clad steel plate may further include a plated layer. The plated layer may be one selected from the group consisting of Zn-based plated layer, Zn—Fe-based plated layer, Zn—Al—based plated layer, Zn—Mg-based plated layer, Zn—Mg—Al-based plated layer, Zn—Ni-based plated layer, Al—Si-based plated layer, and Al—Si—Mg-based plated layer.

Production Method of Clad Steel Plate Having Excellent Strength and Formability

Hereinafter, a production method for a clad steel plate, having excellent strength and formability, which may be another aspect of the present disclosure, will be described in detail.

A production method for a clad steel plate, having excellent strength and formability, which may be another aspect of the present disclosure, may include:

preparing a base material, an austenitic high-manganese steel satisfying the above described alloy composition;

preparing cladding materials, which are martensitic carbon steel satisfying the above described alloy composition;

disposing the base material between two of the cladding materials to obtain a laminate;

welding an edge of the laminate, and heating the welded laminate to a temperature within a range of 1050° C. to 1350° C.; finish rolling the heated laminate to a temperature within a range of 750° C. to 1050° C., to obtain a hot-rolled steel plate;

coiling the hot-rolled steel plate at 50° C. to 700° C.;

pickling the coiled hot-rolled steel plate, and applying a cold-reduction rate of 35% to 90% thereto to obtain a cold-rolled steel plate; and annealing the cold-rolled steel plate at a temperature in a range of between 550° C. or higher and A3+200° C. or lower of the cladding material.

Preparing Operation of Base Material and Cladding Material, and Laminating Operation of Same After a base material and cladding materials satisfying the above described alloy composition are prepared, the base material may be disposed between two of the cladding materials to obtain a laminate. At this time, surfaces of the base material and the cladding material may be cleaned before the laminating operation.

At this time, the base material and the cladding materials may be in the form of a slab, and the manufacturing method of the base material and the cladding material may be produced by applying a general manufacturing process. They are not particularly limited thereto. As a preferable embodiment, the base material may be made into a slab by casting ingot steel produced in an electric furnace or a blast furnace, and the cladding materials may be made into a slab by refining and casting ingot steel produced in a blast furnace to control the content of impurities which may inevitably be contained.

Welding and Heating Operations

An edge of the laminate may be welded, and may be then heated to a temperature within a range of 1050° C. to 1350° C.

The welding the edge of the laminate may prevent oxygen from entering between the base material and the cladding materials, and prevent the generation of oxides during a heating operation.

When a temperature range during the heating operation is lower than 1050° C., a finish rolling temperature during a hot-rolling operation may be difficult to secure. In addition, since a rolling load may increases due to the temperature decrease, a sufficient rolling operation to a predetermined thickness may be difficult to be carried out. Meanwhile, when the heating temperature exceeds 1350° C., it may be not preferable since crystal grain size increases and surface oxidation tends to occur to decrease strength or to dislocate the surface. Further, since a liquid phase film may be formed on a columnar grain boundary of a slab in a continuous casting process, cracks may occur during a subsequent hot-rolling operation.

Hot-Rolling Operation

The heated laminate may be finish rolled in a temperature range of 750° C. to 1050° C. to obtain a hot-rolled steel plate.

When a temperature range of the finish rolling operation is lower than 750° C., a rolling load may increase to drive a rolling mill difficult. Meanwhile, when a temperature range of the finish rolling operation exceeds 1050° C., surface oxidation may occur during a rolling operation.

Coiling Operation

The hot-rolled steel plate may be coiled in a temperature range of 50° C. to 700° C. When a temperature range of the coiling operation is lower than 50° C., a cooling operation by spray of cooling water may be required to reduce a temperature range of the steel plate. Therefore, an unnecessary increase in the process ratio may occur. Meanwhile, when a temperature range of the coiling operation exceeds 700° C., a thick oxide film may be formed on a surface of the hot-rolled steel plate, which makes it difficult to control the oxide layer during a pickling operation. Therefore, a temperature range of the coiling operation is preferably limited to 50° C. to 700° C.

Cold-Rolling Operation

A pickling operation may be subject to, and a cold-rolling reduction rate of 35% to 90% may be applied to the coiled hot-rolled steel plate to obtain a cold-rolled steel plate.

When the cold-rolling reduction rate is lower than 30%, recrystallization of the martensitic carbon steel constituting the cladding material does not occur smoothly, and workability thereof may be deteriorated. Meanwhile, when the cold-rolling reduction rate exceeds 90%, possibility of occurrence of plate fracture may increase due to the presence of load of the rolling operation.

Annealing Operation

The cold-rolled steel plate may be annealed at a temperature range of 550° C. or higher and A3+200° C. or lower of the cladding material. This operation is to secure formability by strength and recrystallization.

When a temperature range of the annealing operation is lower than 550° C., recrystallization of the austenite-type high-manganese steel as the base material may not occur, and sufficient workability may not be secured. Meanwhile, when the cladding material is annealed at a temperature range exceeding A3+200° C., crystal grain of the cladding material may be coarsened. Therefore, strength of the steel may be reduced.

Therefore, the annealing operation is preferably performed at a temperature in a range of between 550° C. or higher and A3+200° C. or lower of the cladding material.

At this time, a cooling rate after the annealing operation may be 5° C./s or more. When the cooling rate is lower than 5° C./s, a martensite fraction of the cladding material may be difficult to be secured in a range of 65 area % or more.

Further, cooling the annealed cold-rolled steel plate to a temperature within a range of Ms (martensitic transformation start temperature) or lower, and then heating and tempering the steel plate at a temperature range of A1 or lower may be further included.

Meanwhile, a forming operation of a plated layer by plating, after the annealing operation, may be further included. The plated layer may be one selected from the group consisting of a Zn-based plated layer, a Zn—Fe-based plated layer, a Zn—Al-based plated layer, a Zn—Mg-based plated layer, a Zn—Mg—Al-based plated layer, a Zn—Ni-based plated layer, an Al—Si-based plated layer, and an Al—Si—Mg-based plated layer.

MODE FOR INVENTION

Hereinafter, the present disclosure will be described more specifically by way of examples. It should be noted, however, that the following examples are intended to illustrate the present disclosure in more detail and not to limit the scope of the present disclosure. The scope of the present disclosure may be determined by the matters described in the claims and the matters reasonably deduced therefrom.

Steel ingots of austenitic high-manganese steels (A1 to A4), martensitic carbon steels (B1 to B4), and extremely low carbon steels (C), which have component compositions shown in the following Table 1, respectively, were prepared, reheated in a heating furnace at a temperature range of 1150° C. for 1 hour, and then rolled at a finish rolling temperature of 900° C. to prepare a hot-rolled steel plate. Thereafter, the hot-rolled steel plate was coiled up at 450° C., pickled, and cold-rolled at a cold-reduction rate of 50% to produce a cold-rolled steel plate. Then, after annealing at an annealing temperature range described in Table 2 below, the steel plate was cooled to room temperature at a cooling rate shown in Table 2. The yield strength (YS), the tensile strength (TS) and the elongation (EL) of each of the prepared specimens were measured using a universal tensile tester, and the results were shown in Table 2 below. The area fraction of each phase constituting the microstructure by observing the microstructure with an optical microscope was shown in Table 2 below.

As can be seen from Table 2, elongation was deteriorated in the martensitic carbon steels (B1 to B4) only, not that of clad steel plates, and the austenitic high-manganese steels (A1 to A4) only were limited to secure a relatively high level of yield strength and tensile strength.

Meanwhile, steel ingots of austenitic high-manganese steels (A1 to A4), martensitic carbon steels (B1 to B4), and extremely low carbon steels (C), which have component compositions shown in the following Table 1, respectively, were prepared, surfaces of the steel ingots were cleansed, high-manganese steel was disposed between two carbon steels, and a three-ply laminate was prepared to have a lamination ratio shown in Table 3 below. Thereafter, an arc welding operation was performed using a welding rod along a boundary of the laminate. The laminate having the welded boundary was reheated in a heating furnace at 1150° C. for one hour, and then rolled at a finish rolling temperature of 900° C. to prepare a hot-rolled steel plate. Thereafter, the hot-rolled steel plate was coiled up at 450° C., pickled, and then cold-rolled at a cold-reduction rate of 50% to produce a cold-rolled steel plate. Then, after annealing at an annealing temperature described in Table 3 below, it was cooled to room temperature at the cooling rate shown in Table 3. Tensile strength (YS), tensile strength (TS), elongation (EL) and TS*EL values of the prepared specimens were measured using a universal tensile tester, and the results were shown in Table 3 below.

TABLE 1

| Steel Type | C | Si | Mn | P | S | Al | N | Ti | B | |
|---|---|---|---|---|---|---|---|---|---|---|
| A1 | 0.51 | 0.03 | 16.8 | 0.013 | 0.0020 | 1.34 | 0.009 | 0.067 | 0.0018 | Cr: 0.210 |
| A2 | 0.60 | 1.51 | 17.3 | 0.010 | 0.0008 | 1.40 | 0.003 | 0.068 | 0.0020 | V: 0.250 |
| A3 | 0.62 | 0.60 | 16.9 | 0.010 | 0.0010 | 1.28 | 0.006 | 0.072 | 0.0024 | Mo: 0.300, V: 0.392 |
| A4 | 1.20 | 0.40 | 13.0 | 0.013 | 0.0021 | 0.03 | 0.006 | — | — | — |
| B1 | 0.15 | 0.1 | 2.8 | 0.010 | 0.0021 | 0.03 | 0.007 | 0.02 | 0.002 | Cr: 0.8, Nb: 0.03 |
| B2 | 0.18 | 0.03 | 3.6 | 0.004 | 0.0017 | 0.03 | 0.005 | 0.02 | 0.0015 | Nb: 0.035 |
| B3 | 0.23 | 0.4 | 1.18 | 0.008 | 0.0026 | 0.03 | 0.006 | — | 0.002 | Ni: 0.12 |
| B4 | 0.34 | 0.15 | 1.3 | 0.009 | 0.0016 | 0.03 | 0.005 | 0.03 | 0.002 | Cr: 0.14, Mo: 0.1 |
| C | 0.002 | 0.03 | 0.1 | 0.009 | 0.0045 | 0.03 | 0.002 | 0.020 | — | Nb: 0.010 |

Austenitic high-manganese steel: A1 to A4,
Martensitic carbon steel: B1 to B4,
Ultra-low carbon steel: C.
The unit of each element content is wt. %.

TABLE 2

| | Manufacturing Conditions | | Properties | | | Microstructure (Area %) | | | | |
|---|---|---|---|---|---|---|---|---|---|---|
| Steel Type | Annealing Temp. (° C.) | Cooling Rate (° C./s) | YS (MPa) | TS (MPa) | EL (%) | Austenite | Ferrite | Martensite | Bainite | Carbide |
| B1 | 850 | 80 | 1042 | 1319 | 8 | | | 100 | | |
| B2 | 850 | 80 | 1115 | 1518 | 7 | | | 100 | | |
| B3 | 850 | 80 | 1203 | 1614 | 7 | | | 100 | | |
| | 770 | 80 | 1253 | 1625 | 8 | | 12 | 88 | | |
| | 850 | 10 | 1179 | 1572 | 9 | | | 79 | 21 | |
| B4 | 850 | 80 | 1283 | 1950 | 8 | | | 100 | | |
| A1 | 850 | 80 | 522 | 1005 | 62 | 100 | | | | |
| A2 | 850 | 80 | 771 | 1128 | 50 | 99 | | | | 1 |
| A3 | 850 | 80 | 865 | 1215 | 42 | 98 | | | | 2 |
| A4 | 850 | 80 | 468 | 1076 | 64 | 100 | | | | |
| C | 850 | 80 | 162 | 295 | 49 | | 100 | | | |

TABLE 3

| | | | Manufacturing Conditions | | Lamination Ratio | | | Properties of Clad Steel Plate | | | |
|---|---|---|---|---|---|---|---|---|---|---|---|
| | Base Material | Cladding Material | Annealing Temp. (° C.) | Cooling Rate (° C./s) | Cladding material | Base Material | Cladding material | YS (MPa) | TS (MPa) | EL (%) | TS * EL (MPa * %) |
| **CE1 | C | B1 | 850 | 80 | 1 | 2 | 1 | 632 | 810 | 15 | 12553 |
| CE2 | A1 | C | 850 | 80 | 1 | 0.5 | 1 | 246 | 420 | 55 | 24026 |
| CE3 | A3 | B1 | 850 | 80 | 1 | 0.5 | 1 | 991 | 1242 | 15 | 18980 |
| *IE1 | A1 | B1 | 850 | 80 | 1 | 2 | 1 | 765 | 1184 | 35 | 40670 |
| IE2 | | B2 | 850 | 80 | 1 | 2 | 1 | 841 | 1248 | 35 | 43522 |
| IE3 | | B3 | 850 | 80 | 1 | 1 | 1 | 1006 | 1366 | 26 | 35745 |
| IE4 | | B4 | 850 | 80 | 1 | 6 | 1 | 719 | 1235 | 49 | 60201 |
| IE5 | | B4 | 850 | 80 | 1 | 2 | 1 | 908 | 1454 | 35 | 51713 |
| IE6 | | B4 | 850 | 80 | 1 | 1 | 1 | 997 | 1659 | 26 | 42510 |
| IE7 | | B3 | 770 | 80 | 1 | 6 | 1 | 723 | 1148 | 46 | 52882 |
| IE8 | | B3 | 770 | 80 | 1 | 2 | 1 | 901 | 1276 | 33 | 43445 |
| IE9 | | B3 | 850 | 10 | 1 | 2 | 1 | 883 | 1298 | 36 | 45742 |
| IE10 | | B3 | 850 | 10 | 1 | 1 | 1 | 978 | 1326 | 27 | 36880 |
| IE11 | A2 | B1 | 850 | 80 | 1 | 6 | 1 | 857 | 1226 | 40 | 46442 |
| IE12 | | B1 | 850 | 80 | 1 | 2 | 1 | 879 | 1180 | 29 | 35482 |
| IE13 | | B2 | 850 | 80 | 1 | 6 | 1 | 890 | 1218 | 40 | 48101 |
| IE14 | | B2 | 850 | 80 | 1 | 1 | 1 | 1004 | 1392 | 22 | 29611 |
| IE15 | | B3 | 850 | 80 | 1 | 2 | 1 | 939 | 1321 | 29 | 39074 |
| IE16 | | B4 | 850 | 80 | 1 | 6 | 1 | 894 | 1376 | 40 | 52673 |
| IE17 | | B4 | 850 | 80 | 1 | 2 | 1 | 1007 | 1576 | 29 | 44631 |
| IE18 | | B4 | 850 | 80 | 1 | 1 | 1 | 1059 | 1657 | 22 | 36872 |
| IE19 | | B3 | 770 | 80 | 1 | 2 | 1 | 1035 | 1371 | 29 | 38626 |
| IE20 | | B3 | 770 | 80 | 1 | 1 | 1 | 1149 | 1507 | 21 | 31175 |
| IE21 | | B3 | 850 | 10 | 1 | 2 | 1 | 1018 | 1318 | 30 | 39825 |
| IE22 | | B3 | 850 | 10 | 1 | 1 | 1 | 1029 | 1467 | 23 | 32277 |

TABLE 3-continued

| | Base Material | Cladding Material | Manufacturing Conditions | | Lamination Ratio | | | Properties of Clad Steel Plate | | | |
| --- | --- | --- | --- | --- | --- | --- | --- | --- | --- | --- | --- |
| | | | Annealing Temp. (° C.) | Cooling Rate (° C./s) | Cladding material | Base Material | Cladding material | YS (MPa) | TS (MPa) | EL (%) | TS * EL (MPa * %) |
| IE23 | A3 | B1 | 850 | 80 | 1 | 6 | 1 | 933 | 1224 | 34 | 41574 |
| IE24 | | B1 | 850 | 80 | 1 | 2 | 1 | 968 | 1207 | 25 | 31675 |
| IE25 | | B2 | 850 | 80 | 1 | 6 | 1 | 951 | 1313 | 33 | 42917 |
| IE26 | | B2 | 850 | 80 | 1 | 2 | 1 | 1004 | 1396 | 25 | 33479 |
| IE27 | | B4 | 850 | 80 | 1 | 6 | 1 | 946 | 1339 | 34 | 46858 |
| IE28 | | B4 | 850 | 80 | 1 | 2 | 1 | 1100 | 1611 | 25 | 39563 |
| IE29 | | B4 | 850 | 80 | 1 | 1 | 1 | 1132 | 1623 | 20 | 32963 |
| IE30 | | B3 | 850 | 10 | 1 | 1 | 1 | 1078 | 1389 | 20 | 29060 |
| IE31 | A4 | B1 | 850 | 80 | 1 | 2 | 1 | 727 | 1163 | 36 | 43110 |
| IE32 | | B1 | 850 | 80 | 1 | 1 | 1 | 846 | 1286 | 27 | 33013 |
| IE33 | | B2 | 850 | 80 | 1 | 2 | 1 | 805 | 1268 | 36 | 46044 |
| IE34 | | B2 | 850 | 80 | 1 | 1 | 1 | 862 | 1427 | 26 | 35637 |
| IE35 | | B3 | 850 | 80 | 1 | 1 | 1 | 944 | 1408 | 26 | 37301 |
| IE36 | | B4 | 850 | 80 | 1 | 2 | 1 | 887 | 1504 | 36 | 54468 |
| IE37 | | B4 | 850 | 80 | 1 | 1 | 1 | 1058 | 1711 | 27 | 44231 |
| IE38 | | B3 | 770 | 80 | 1 | 2 | 1 | 890 | 1288 | 36 | 46148 |
| IE39 | | B3 | 770 | 80 | 1 | 1 | 1 | 972 | 1464 | 26 | 36937 |
| IE40 | | B3 | 850 | 10 | 1 | 2 | 1 | 845 | 1305 | 37 | 48326 |
| IE41 | | B3 | 850 | 10 | 1 | 1 | 1 | 956 | 1340 | 27 | 38449 |

*IE: Inventive Example,
**CE: Comparative Example

It can be seen that Inventive Examples 1 to 41 which satisfy both the composition and the microstructure of the present disclosure have yield strength of 700 MPa or more and a product of tensile strength and elongation of 25,000 MPa % or more.

In Comparative Example 1, the thickness ratio of the base material and the cladding material proposed in the present disclosure may be satisfied, but a microstructure of the base material may be composed of a ferrite single phase. Therefore, yield strength of 700 MPa or more and a product of tensile strength and elongation of 25,000 MPa % or more may not be secured.

Meanwhile, in Comparative Example 2, the thickness ratio of the base material and the cladding material proposed in the present disclosure may be satisfied, but a microstructure of the cladding material may be composed of a ferrite single phase. Therefore, yield strength of 700 MPa or more and a product of tensile strength and elongation of 25,000 MPa % or more may not be secured.

Meanwhile, in Comparative Example 3, a microstructure of the base material and the cladding material may satisfy the conditions proposed in the present disclosure, but a thickness ratio of the base material was made to be 30% or less. Therefore, yield strength of 700 MPa or more and a product of tensile strength and elongation of 25,000 MPa % or more may not be secured.

FIG. 1 is a schematic view of a clad steel plate in which austenitic high-manganese steel is used as a base material 2 and martensitic carbon steels are used as cladding materials 1 and 3.

Figure 2:
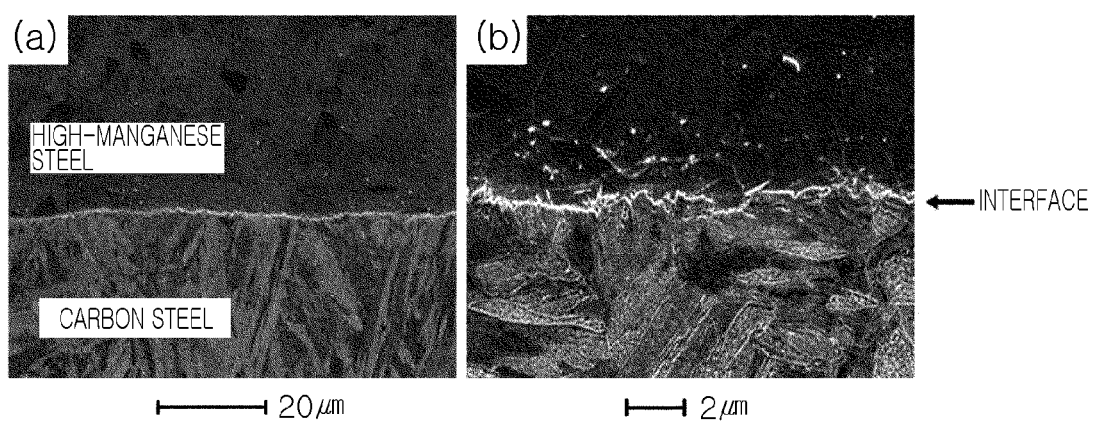
FIG. 2 is an image of a cross-sectional surface of Inventive Example 1 captured by a scanning electron microscope, in which (a) was captured at a magnification of 1,500 times, and (b) was captured at a magnification of 8,000 times.

FIG. 2 is an image of a cross-sectional surface of Inventive Example 1 taken by a scanning electron microscope, in which (a) was captured at a magnification of 1,500 times, and (b) was captured at a magnification of 8,000 times. As can be seen, an interface was formed as a boundary, the high-manganese steel, which may be the base material, was recrystallized and has a uniform microstructure, the carbon steel, which may be the cladding material, developed an acicular structure unique to martensitic steel. No oxide was found at the interface between the base material and the cladding material. Therefore, the interfacial bonding force was secured, and no fracture due to the interface separation has occurred during processing.

Figure 3:
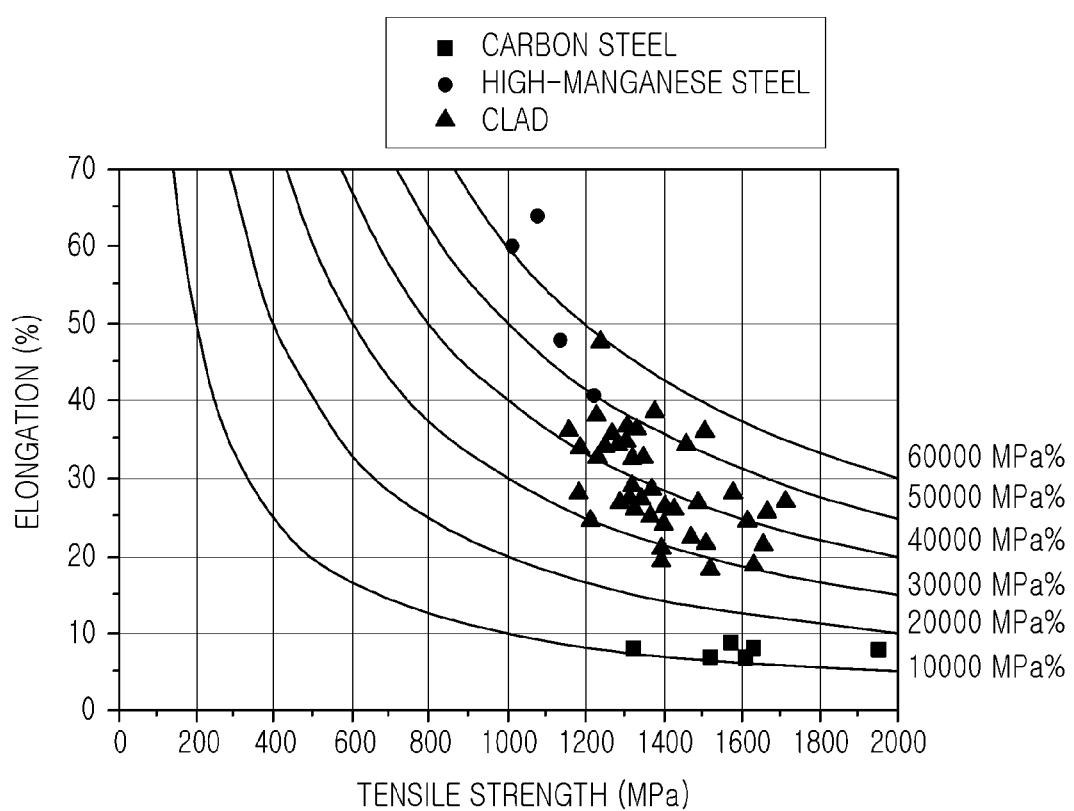
FIG. 3 is a graph illustrating tensile strength and elongation of martensitic steels 1 to 4, high-manganese steels 1 to 4, as shown in Table 1, and Inventive Examples 1 to 41, as shown in Table 3.

FIG. 3 is a graph illustrating tensile strength and elongation of the austenitic high-manganese steels (A1 to A4), the martensitic carbon steels (B1 to B4) in Table 1, and Inventive Examples 1 to 41 in Table 3. As can be seen, the alloy composition, microstructure and thickness ratio of the manganese steel, which may be the base material, and the high-manganese steel, which may be the cladding material, may be controlled to produce various tensile strength and elongation steels. In addition, yield strength and formability of a steel material according to the present disclosure may be excellent, and a clad suitable for a vehicle structural member, having a product of tensile strength and elongation of 25,000 MPa % or more, may be manufactured.

While exemplary embodiments have been shown and described above, it will be apparent to those skilled in the art that modifications and variations could be made without departing from the scope of the present disclosure as defined by the appended claims.

The invention claimed is:

1. A clad steel plate having excellent strength and formability, the clad steel plate comprising:
   a base material;
   a cladding material provided on both side surfaces of the base material; and
   a yield strength of 700 MPa or more, and a product of tensile strength and elongation of 25,000 MPa % or more,
   wherein the base material is an austenitic high-manganese steel comprising, by weight, 0.3% to 1.4% of C, 12% to 25% of Mn, 0.0005% to 0.005% of B, and a remainder of Fe and inevitable impurities, and
   the cladding material is a martensitic carbon steel comprising, by weight, 0.09% to 0.34% of C, 1.18% to 4.5% of Mn, and a remainder of Fe and inevitable impurities.

2. The clad steel plate according to claim 1, wherein the austenitic high-manganese steel further comprises, by weight, 0.03% to 2.0% of Si, 0.02% to 2.5% of Al, 0.04% or less of N (excluding 0%), 0.03% or less of P, and 0.03% or less of S.

3. The clad steel plate according to claim 2, wherein the austenitic high-manganese steel further comprises, by weight, one or more of 0.01% to 0.5% of Ti, 0.05% to 1.0% of Mo, 0.2% to 3.0% of Cr, 0.01% to 0.5% of Nb, and 0.05% to 0.7% of V.

4. The clad steel plate according to claim 1, wherein the martensitic carbon steel further comprises, by weight, 0.03% to 1.0% of Si, 0.02% to 0.3% of Al, 0.04% or less of N (excluding 0%), 0.0005% to 0.005% of B, 0.03% or less of P, and 0.03% or less of S.

5. The clad steel plate according to claim 4, wherein the martensitic carbon steel further comprises, by weight, one or more of 0.1 to 1.0% of Cr, 0.1% to 1.0% of Ni, 0.05% to 1% of Mo, 0.005% to 0.05% of Ti, and 0.005% to 0.05% of Nb.

6. The clad steel plate according to claim 1, wherein a thickness of the base material is 30% to 90% of a thickness of the clad steel plate.

7. The clad steel plate according to claim 1, wherein a microstructure of the austenitic high-manganese steel is an austenite single phase.

8. The clad steel plate according to claim 1, wherein the martensitic carbon steel has a microstructure including: 65 area % or more of martensite or tempered martensite; and a remainder of one or more of retained austenite, ferrite, bainite, and carbide.

9. The clad steel plate according to claim 1, further comprising: a plated layer.

10. The clad steel plate according to claim 9, wherein the plated layer is one selected from the group consisting of a Zn-based plated layer, a Zn—Fe-based plated layer, a Zn—Al-based plated layer, a Zn—Mg-based plated layer, a Zn—Mg—Al-based plated layer, a Zn—Ni-based plated layer, an Al—Si-based plated layer, and an Al—Si—Mg-based plated layer.

* * * * *